DEVICE FOR USE IN THE PRODUCTION OF CHEESE

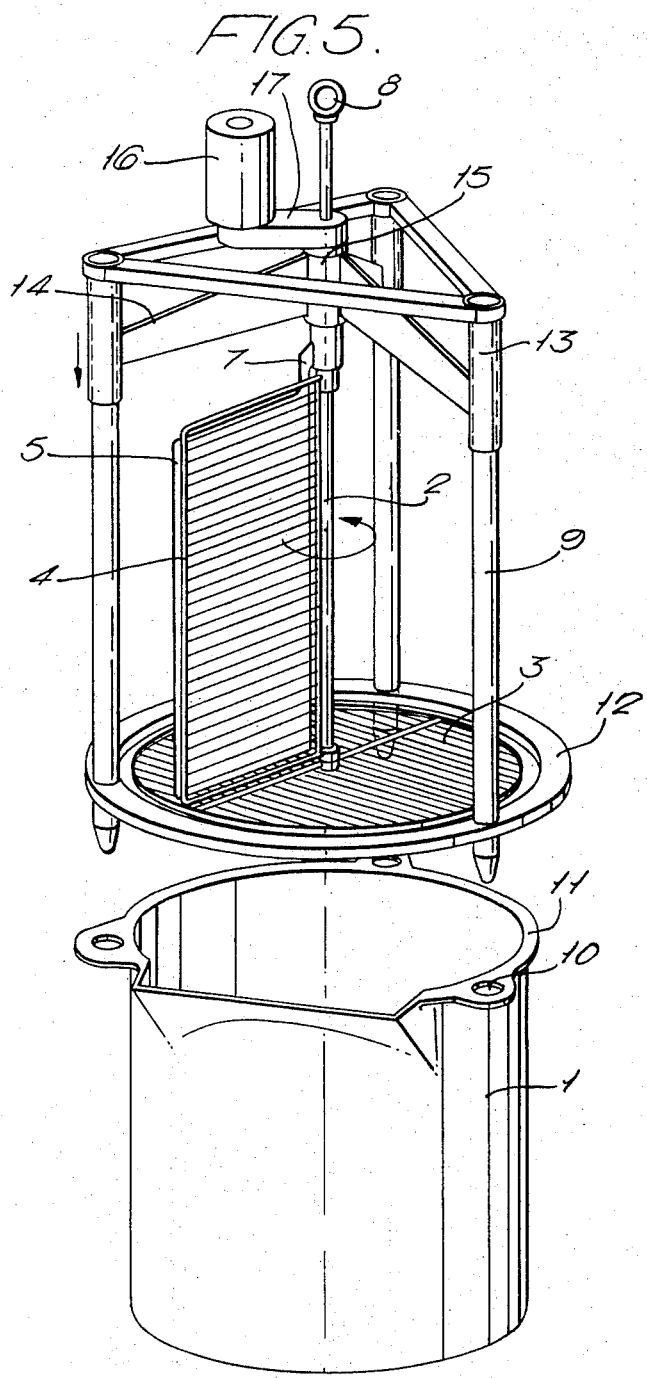

3,836,688
DEVICE FOR USE IN THE PRODUCTION OF
CHEESE
Wilhelm Fischer, Durach, Friedrich Krause, Durach-Heberlings, Walter Riesner, Durach, and Hubert Sonnenmoser, Kempten, Germany, assignors to Lever Brothers Company, New York, N.Y.
Filed Mar. 19, 1973, Ser. No. 342,911
Claims priority, application Germany, Mar. 21, 1972, P 22 13 545.1
Int. Cl. A23c 19/02
U.S. Cl. 426—518                    5 Claims

ABSTRACT OF THE DISCLOSURE

A device for cutting cheese curd during its coagulation which comprises a vertical frame of parallel wires and a horizontal frame of parallel wires. These are carried on a rotary shaft which enables three cuts at right angles to one another to be made in the curd to form cubes. The particular arrangement avoids double cutting which would result in undesirable curd dust.

---

The invention relates to an improved device for cutting the coagulated milk in cheesemakers or similar vats and the process to be carried out with it, in particular for the production of soft cheese.

When cheese is being manufactured, wire cutters are normally used to break the coagulum up into curd cubes. The cubes thus formed should be as uniform as possible. The coagulum or curd cubes should ideally not be exposed to any mechanical stress until a certain length of time has elapsed after cutting. Multiple parallel cuts which can arise in the course of the to and fro motion of the cutting tool are to be avoided since fine slivers, or curd dust, are produced. These slivers or dust then run off with the whey as it is drained away and hence the yield is reduced. Moreover it is thought that the ratio of the volume of the curd cubes to their surface area has an effect on the quality of the finished product, and thus, incorrect cutting is to be avoided. This applies in particular to the manufacture of soft cheeses such as camembert and brie.

One difficulty arising in the course of cutting is that three mutually perepndicular cuts have to be made. In doing this two cutting processes can be combined if the cutting tool consists of cutting wires clamped at right angles. A cutting frame of this kind revolving about a fixed central shaft in a cylindrical cheese vat is known for example from German patent specification 895,072. This device suffers from the disadvantage that for the third cutting direction the tool must be moved to and fro through the mass.

Furthermore from German Utility Model 7117364 a cutting device is known which, in addition to a frame with radially disposed cutting wires and capable of being swivelled about a spindle against a dividing wall, has a cutting frame adapted to the concical shape of the vat base on which cutting blades are arranged both in the form of concentric rings and radial spokes. The vat is cylindrical and has a base which slopes down to a discharge valve. The device is introduced into the coagulated milk from above so that two cuts are made simultaneously. The horizontal cut is then made by means of the frame revolving about the spindle and the device is lifted out of the vat again. The simultaneous cutting with the intersecting concentric and radial cutting blades produces curd cubes of non-uniform size which moreover break off at the edges where two cutting surfaces intersect and block the blades. Furthermore the curd is damaged by the withdrawal of the device.

According to the present invention a device is proposed comprising a carrier assembly which is arranged to be located on top of the vat when in use, a support shaft which is arranged, when in use, to be lowered downwardly from said carrier assembly into an axial position in the vat, a retaining plate located in a horizontal plane and extending radially from said support shaft, a vertical cutter frame extending radially from said support shaft, carrying a plurality of horizontal cutting elements lying mutually parallel in a vertical plane, and being rotatable through 360° relative to the retaining plate, and a circular horizontal cutter frame carried at the lower end of said shaft, carrying a plurality of horizontal cutting elements lying mutually parallel in a horizontal plane, and being relatively rotatable through 90° about a central axis of the vat with reference to the position of said retaining plate.

The width of the vertical cutting frame and of the retaining plate should be substantially equal to the radius of the vat while the horizontal cutting frame should fill the entire cross section of the vat. It can moreover be useful to fit the horizontal cutting frame and/or the vertical cutting frame to the shaft in a detachable manner. By using different cutting frames with various spacings between the cutting elements it is possible to vary the size of the curd cubes. Cutting wires are preferably used as the cutting elements.

The procedure to be followed according to the invention with this device is such that an initial vertical cut is made as the horizontal cutting frame descends when the device is introduced into the cheese vat. After this a horizontal cut is made by turning the vertical cutting frame through 360°. While this is being done the mass is held in position in the vat by the retaining plate. After this the mass in the vat is swivelled through 90 degrees by turning the retaining plate. This is suitably done with the vertical cutting frame lying flat against the retaining plate so that it turns with the latter. After this an additional vertical cut is made with the horizontal cutting frame as the device is withdrawn from the cheese vat.

Instead of rotating the mass with respect to the horizontal cutting frame with the aid of the retaining plate before the execution of the second vertical cut it can be advantageous to hold the mass in position in the vat by means of the retaining plate and turn the horizontal cutting frame through 90°. The rotation of the horizontal cutting frame should be carried out before making the horizontal cut.

A cutting frame which can be displaced in the axial direction of a vat is already known from German patent specification 900,888. In the case of circular vats this only has the cross section of a sector of a circle. After immersing this cutting frame the cheese mass in the vat is shifted through an appropriate angle by means of a plate and then the frame is lifted out of the vat again. This procedure is repeated several times. Cutting in the two remaining directions is additionally carried out by means of a vertical frame latticed in the horizontal and vertical directions. The disadvantage of this device lies not only in the fact that with the horizontal frame in the shape of a segment of a circle and spanned by parallel cutting elements it is not possible to cut essentially cube-shaped pieces but also in that as a result of the repeated turning of the already partially cut mass and as a result of the repeated lowering and raising of the frame the partially cut curd floats freely in the whey which has separated and thus at the later stages of cutting it is not possible to execute satisfactory cuts. Moreover the vertical latticed frame exerts an undesired pressure on the mass and this has the effect that the edges of the curd pieces are not satisfactory.

By contrast to the older device mentioned above the process to be carried out according to the invention is also distinguished in that the curd pieces produced by three successive cuts are cubes which are identical in shape, volume and surface area with the necessary exception of a few curd pieces in the immediate vicinity of the tank walls.

When cutting the curd the last of the three cuts in particular is regarded as critical since once the cutting process has been started whey separated out and the strips or pieces of curd produced float in the whey so that they can be easily broken or otherwise damaged as a result of further movement. The advantage of the device according to the invention is now evident in that the cheese mass in the cylindrical vat e.g. is rotated only once and only through 90° and the third cut is made against the weight of the curd uniformly distributed over the entire surface area of the cheese vat by the withdrawal of the horizontal cutting frame.

As to whether the mass or the horizontal frame is rotated depends, e.g. on the shape of the vat, i.e. on the ratio of its height or its diameter. If there is a danger that after the first two cuts have been made the pieces of curd floating in the whey which has separated out will be thrown about or be displaced relative to each other as a result of rotation by means of the retaining plate particularly if the vat has a large diameter it is better to rotate the horizontal cutting frame.

The process according to the invention can be carried out with a device operating completely automatically. For this purpose the device is permanently mounted in a room. When a vat containing coagulated milk is brought under the device the individual movements of the device are carried out in succession by means of mechanical power units, preferably by means of a hydraulic drive linked to a stepping mechanism. Suitable guides are used to centre the device over the vat. The vat can circulate continuously round a fixed route and the cutting device can be suspended in such a manner that it moves with the tank during the cutting process.

The invention is described once more with the aid of the embodiment illustrated in the attached drawings.

FIG. 5 shows a perspective view of the device positioned above a vat.

Figure 1:
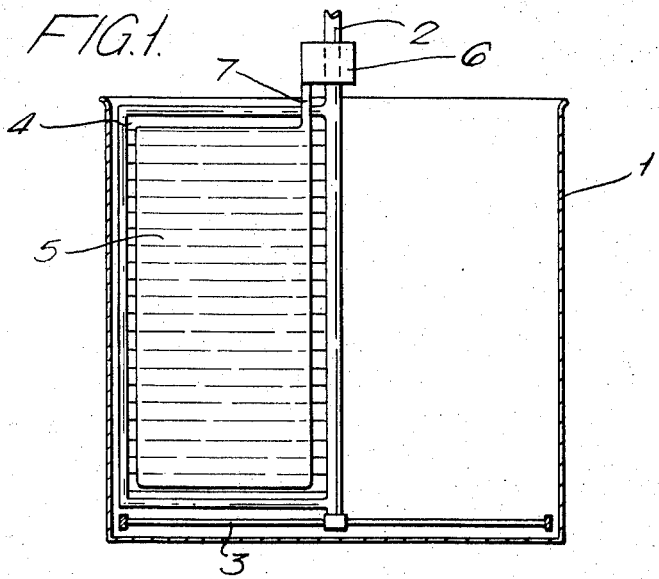
FIG. 1 shows a cross section through a vat with the device in position.

The cutting device is introduced into a cylindrical cheese vat 1 through its open top end. It consists of a shaft 2 with a horizontal cutting frame 3 located at its lower end. The cutting frame 3 is provided with mutually parallel cutting elements. The shaft 2 can take the form of a hollow shaft through which a rod which is not illustrated leads to the cutting frame 3 so that the latter does not turn when the shaft 2 is rotated or can be turned independently of it. It is also possible, however, to mount the cutting frame 3 at the end of the shaft 2 so that it is free to rotate and to prevent it from turning by securing it in an appropriate manner to the wall of the vat 1. A vertical cutting frame 4 which is provided with horizontal cutting elements is rigidly attached to the rotatable shaft 2. A retaining plate 5 is fitted so that it can rotate on the shaft 2 or on a separate guide rod 7 parallel to this.

Figure 2:
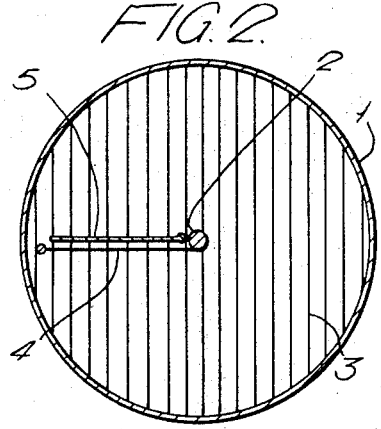
FIG. 2 shows a plan view of the vat after the first cut has been made.
Figure 3:
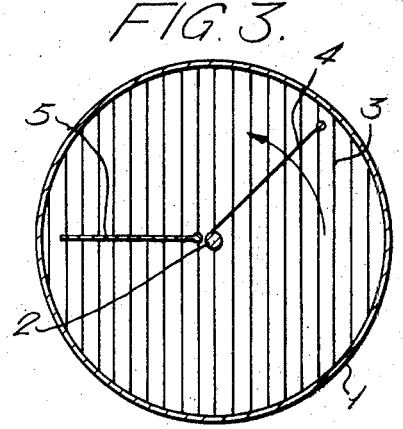
FIG. 3 shows a plan view of the vat during the second cut.
Figure 4:
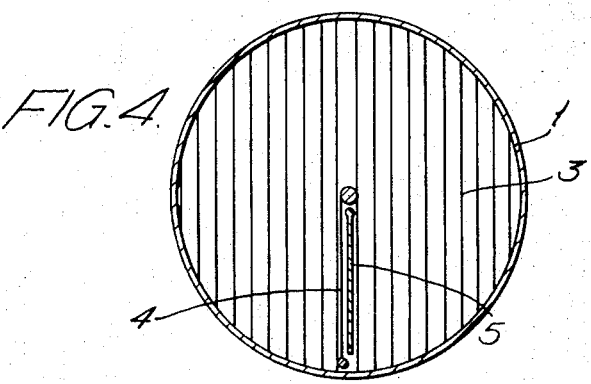
FIG. 4 shows a plan view of the vat when the third cut is being made, the cheese mass having previously been turned through 90° by means of the retaining plate.

The vat 1 can be mobile and the cutting device may be suspended in an appropriate manner from the ceiling of a room. When the vat arrives below the cutting device, which can if necessary occur in the course of the continuous circulation of a number of separately filled vats on their way between a filling station and a station where they are discharged into a moulding device, the cutting device is lowered into the vat, the device being suspended in such a way that it moves with the vats during the cutting process. The first cut is made at this point by the horizontal cutting frame 3 according to FIG. 2. To make a horizontal cut the vertical cutting frame 4 is now pivotted through 360° by means of the shaft 2. While this is being done the cheese mass in the vat is prevented from turning by means of the retaining plate 5. This process is shown in FIG. 3. When the vertical cutting frame 4 comes to rest against the retaining plate 5 they are both turned together through a further 90°. The entire mass of cheese in the vat 1 is turned with them. The third cut is now made by withdrawing the entire device from the vat 1 again. The cutting elements of the horizontal cutting frame 3 are not at right angles to the cuts which they made when the device was being introduced. This process is illustrated in FIG. 4.

The suspension of the device and the means for lowering it into the cheese vat can be designed by means well known to those skilled in the art. The installation of a geared motor 6 or a pneumatic of hydraulic cylinder at the upper end of the shaft may be useful for providing the power to turn the cutting frame 4 and the retaining plate 5.

The cutting device shown in FIG. 5 is permanently fitted to a lifting apparatus not shown in the drawing and capable if necessary of being moved over the ceiling of the room and can hang from a rope passed through the eyelet 8 or from a chain. As soon as a vat 1 containing a cheese mass ready for cutting is positioned under the device, for which purpose, e.g. the device can also be moved into position over the vat by means of a guide rail for the lifting apparatus, the device is lowered until the pointed guide rods 9 interlock with holes 10 on the upper rim 11 of the vat 1 and the ring 12 linking the lower parts of the guide rods 9 rests on the rim 11 of the vat. In this manner the device is centered with respect to the vat. Other or additional aids for centering can be used according to the operating conditions. As the cutting device is lowered further into the vat sleeves 13 which are connected via supports 14 to bearing 15 for the shaft 2 slide downwards along the guide rods 9. This gives rise to the first vertical cut. Now in contrast to the procedure illustrated in FIGS. 2 to 4, the horizontal cutting frame 3 is turned through 90° by means of a hydraulic motor 16 while the cheese mass is held in position by means of the plate 5. The vertical cutting frame 4 is thereupon rotated through 360° by means of the motor 16 and the stepping mechanism 17, the cheese curd mass again being held in position by the plate. The device is then raised out of the tank 1 by means of the lifting apparatus until the seleves 13 are once more at the upper end of the guide rods 9 after which the ring 12 is lifted clear of the upper rim 11 of the tank.

The entire cutting process can proceed automatically by using appropriate control and driving elements at least after centering on the vat. This has the advantage that the cutting process to be carried out successively in several vats are always carried out successively in several vats are always carried out consistently in the manner chosen as providing optimum conditions. Human errors such as insufficient lowering or repetition of the horizontal cut which might result in a loss of quality are avoided.

Apart from improving working methods during cutting, the amount of finely divided cheese is reduced and hence the yield improved by the fact that one cutting element is moved only once in each cutting direction and agitation of the freshly cut curd is avoided. The uniformly shaped curd cubes produced help to ensure that the soft cheese made from them is of a uniform and excellent quality even when the curd is prepared in vats with a capacity of 1000 litres or more.

What we claim is:

1. A device for use in a cylindrical vat to cut curd during the production of cheese, comprising a carrier assembly which is arranged to be located on top of the vat when in use, a support shaft which is arranged, when in use, to be lowered downwardly from said carrier assembly into an axial position in the vat, a retaining plate located in a vertical plane and extending radially from said support shaft, a vertical cutter frame extending radially from said support shaft, carrying a plurality of horizontal cutting elements lying mutually parallel in a vertical plane, and being rotatable through 360° relative to the retaining plate, and a circular horizontal cutter frame carried at the lower end of said shaft, carrying a plurality of horizontal cutting elements lying mutually parallel in a horizontal plane, and being relatively rotatable through 90° about a central axis of the vat with reference to the position of said retaining plate.

2. A device according to Claim 1 which is arranged so that relative rotational movement between the horizontal cutter frame and the retaining plate is affected by maintaining the horizonal cutter frame stationary and moving the retaining plate and body of curd through 90°.

3. A device according to Claim 1 which is arranged so that relative rotational movement between the horizontal cutter frame and the retaining plate is affected by maintaining the horizontal cutter frame stationary and moving the cutter frame through 90°.

4. Process for cutting cheese curd with a device according to Claim 1 characterised in that an initial vertical cut is made by lowering the horizontal cutting frame, after which a horizontal cut is made by turning the vertical cutting frame through 360° while the curd mass in the tank is held in place by means of the retaining plate, then the curd mass is repositioned relative to the cutting elements of the horizontal cutting frame by an angle of 90° and a second vertical cut at 90° to the firs vertical cut is made by lifting out the horizontal cutting frame.

5. Process according to Claim 4 characterised in that after the first vertical cut and the horizontal cut the mass is turned through 90° by rotation of the retaining plate.

References Cited
UNITED STATES PATENTS

| | | | |
|---|---|---|---|
| 2,717,212 | 9/1955 | Hensgen et al. | 426—036 |
| 3,132,026 | 5/1964 | Radema et al. | 426—036 |

A. LOUIS MONACELL, Primary Examiner

R. A. YONCOSKIE, Assistant Examiner

U.S. Cl. X.R.

426—36, 188, 361; 99—452, 460